INVENTORS
HENDRIK VAN DER STEEG
ALBERT J. YTSMA
BY
Frank R. Trifari
AGENT 3,328,77
Patented June 27, 196

3,328,779

MAGNETIC MEMORY MATRIX WITH MEANS FOR REDUCING DISTURB VOLTAGES

Hendrik van der Steeg and Albert Jan Ytsma, Hilversum, Netherlands, assignors to North American Philips Company, Inc., New York, N.Y., a corporation of Delaware Filed Mar. 12, 1963, Ser. No. 264,665
Claims priority, application Netherlands, Mar. 12, 1962, 275,826
3 Claims. (Cl. 340—174)

This invention relates to static magnetic memory devices and in particular to magnetic-core matrix memories.

These memories are generally made up of magnetic cores composed of a material having a rectangular hysteresis loop, with the cores being arranged in rows and columns. The cores arranged in a particular row are coupled to a common read wire which is connected to a pulse generator adapted to be switched into circuit; likewise, the cores arranged in a particular column are coupled to a common read wire also coupled to a pulse generator adapted to be switched into circuit. A common read-out conductor is coupled to all the cores in a particular manner and is connected to a read-out detector. When the pulse generators connected to the read conductors coupled to a particular core are both switched in, each pulse generator supplies a pulse which by itself has an amplitude incapable of changing the magnetization state of a core; the two pulses together, however, have a combined amplitude capable of setting the particular core to a given state of magnetization of remanence.

In such magnetic-core matrix memories, read-out of the information in the memory consists of determining, from the nature of the voltage induced in the read-out conductor, the initial state of magnetization of the particular core, i.e., whether the core contained the binary information "0" or "1."

This determination, however, cannot always be made with certainty for a particular core since interference or disturb voltages are generally induced in the common read-out conductor by the cores coupled to only one of the read wires. Various proposals have been made to eliminate or compensate for these disturb pulses. Generally, however, these proposals have tended to render the read-out detectors or other circuit parts more complicated and costly.

The primary object of the invention is to provide a magnetic-core matrix memory of the above type in which the deleterious effects of the disturb voltages are eliminated to a great degree.

According to a major aspect of the invention and in furtherance of the above object, each pulse generator is connected to its corresponding selection wire through a linear integrating circuit, which may take the form, for example, of a Miller integrator.

Figure 1:
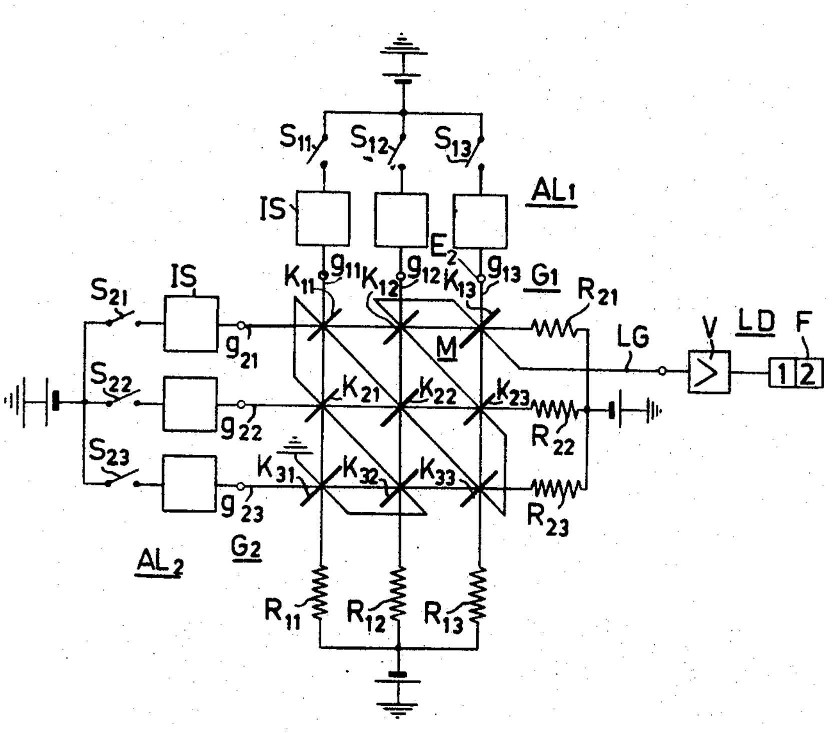
Figure 2:
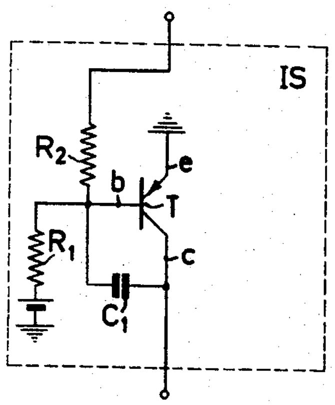

In order that the invention may be readily carried into effect, it will now be described, by way of example, with reference to the accompanying drawing, in which:

FIG. 1 shows a static magnetic-core matrix memory in accordance with the invention; and FIG. 2 illustrates a linear integrating circuit arrangement suitable for use in the device shown in FIG. 1.

The static magnetic memory device shown in FIG. 1 comprises a memory matrix M which is connected through a first group $G_1$ of read wires $g_{11}$–$g_{13}$ to a read-drive device $AL_1$, and through a second group $G_2$ of read wires $g_{21}$–$g_{23}$ to a read-drive device $AL_2$. The devices for writing information in the memory matrix M are not necessary for an understanding of the invention and do not form a part thereof; they are consequently not shown in the drawing. A read-out wire LG common to all the cores is also shown connected to read-out detector LD.

The memory matrix M comprises a plurality of cores $K_{11}$–$K_{33}$ each of which is composed of magnetic material having a rectangular hysteresis loop. In the embodiment shown, the memory matrix comprises three rows and three columns of cores; the invention is not limited thereto, however, since the rows and columns may have an arbitrary number of cores. Each core is coupled to two read wires, i.e., to a read wire of group $G_1$ and to a selection wire of group $G_2$. A core is always in one of the two possible states of remanence or information 0 and 1.

In order to read the information state of a particular core, the read-drive device $AL_1$ cooperates with the read-drive device $AL_2$. Read-drive device $AL_1$ applies a current pulse through the read wire of group $G_1$ coupled to the particular core desired to be read out and read-drive device $AL_2$ applies a current pulse through the read conductor of group $G_2$ coupled to the same core. The magnetic fluxes induced in the selected core due to each current pulse reinforce each other and the pulses set the selected core to the state 0. The flux change due to one pulse only is not capable of changing the state of magnetization of a core permanently; therefore, at the end of the current pulse, the cores coupled to only one of the current-carrying read conductors return to their initial remanence or information state. If the core initially is in the state 1, a non-reversible flux variation occurs in the core during the reading of the information, i.e., the remanence condition of the core flips over from the condition corresponding to the state 1 to that corresponding to the state 0. This flipover occurs mainly during the time duration of the peaks of the current pulses. If the core is originally in the state 0, a reversible flux variation occurs in the core, i.e., the remanence condition returns to the initial condition corresponding to the state 0. The flux variations occur mainly at the times of occurrence of the edges of the current pulses. Hence, the selected core, i.e., the one whose remanence condition has flipped over, induces a voltage pulse in the read-out wire LG coupled to all the cores, this voltage pulse having a duration which is longer than that of the voltages induced in said read-out wire by reversible flux variations in non-selected cores.

The cores coupled to only one of the activated read wires induce interference or disturb voltages in the read-out wire LG. These interference voltages occur mainly during the times of occurrence of the edges of the current pulses applied to the read wires, since the remanence of each of these cores returns to the initial condition and only reversible flux variations occur. In order to reduce the total interference voltage induced in the read-out wire, wire is alternately coupled to the cores in opposite se. For this purpose, for example, the read-out wire hreaded diagonally through the matrix. In this manner, interference voltages induced in the read-out wire by non-selected cores tend to compensate each other. is compensation is not complete, however, since all the erference voltages induced by the cores occur at differ- times due to inherent differences in the magnetic prop- ies of the various cores. The read-out detector LD nected to read-out wire LG is responsive to the voltage ich is induced in the read-out wire, this voltage being nposed of the output voltage of a selected core and total interference voltage.

In order that merely a determination of the amplitude the voltage induced in the read-out conductor may be fficient, it has already been suggested to connect an luctance in series with the read-out conductors. The ding edges of the read-out pulses then increase expo- ntially with time, and the rise time can be controlled variation of the inductance. The output voltage of ad-out conductor LG, which may be amplified, is com- red in any known manner with a threshold voltage in e read-out amplifier V and, when the threshold voltage exceeded, the read-out amplifier V sets a bistable trig- r circuit F to the state 1; this indicates that the selected re initially contained the information 1. It is, however, fficult to distinguish voltages only slightly different from threshold voltage, since the tolerances of the circuit ements to be used must satisfy exacting requirements. y the use of a series-connected inductance the interfer- ice voltage may be reduced to any desired value, but ith increase in the value of the inductance the output ltage of a flipped-over core also decreases. In practice, ie requirement is imposed that this output voltage must ave a minimum given value so that the highest admissible alue of the inductance is then fixed.

According to the instant invention, read-out current ulses are used having leading edges increasing linearly ith time. Measurements have shown that a surprisingly reat improvement in the ratio between the output voltage nd the interference voltage is thus obtained; the said atio may be improved by as much as a factor of three.

The read-out devices $AL_1$ and $AL_2$ each include a plu- ality of pulse generators which can be switched into cir- uit and are represented by contacts $S_{11}$–$S_{13}$ and $S_{21}$–$S_{23}$, espectively. A core in the memory matrix M is selected nd read by closing one of the switches $S_{11}$–$S_{13}$ and one of he switches $S_{21}$–$S_{23}$ for the desired duration of the read ulse. According to the invention, each of the read-out levices $AL_1$ and $AL_2$ also includes a linear integrating ircuit arrangement IS connected between the pulse gen- rators and the read wires. A linear integrating circuit rrangement suitable for use in the device shown in FIG. 1 is shown in greater detail in FIG. 2. This circuit arrange- nent is a so-called Miller integrator and comprises a ransistor T, the emitter *e* of which is connected to ground ind the collector *c* of which is fed back through a capaci- or $C_1$ to the base *b*. A voltage normally blocking the ransistor is supplied through resistor $R_1$ to the base *b*. Applied to the matrix shown in FIG. 1, the collectors of the transistors T included in the integrating circuits are connected through the read wires and the current-limiting resistors $R_{11}$–$R_{13}$ and $R_{21}$–$R_{23}$, respectively, to the negative terminal of a supply source. During reading of the infor- mation state of a selected core, a negative voltage derived from a battery is supplied through a switch S to the base of transistor T in the corresponding integrating circuit IS through a resistor $R_2$. This voltage drives the transistor into the conducting state. The voltage at the collector electrode C increases linearly with time until the transistor T has reached the state of saturation. The current then flowing through the transistor is substantially determined by the supply voltage set up in the emitter-collector circuit and by the value of the current-limiting resistor. After the switch S has been opened, the collector voltage decreases in an analogous manner. The operation of the switch can be explained as follows: Resistor $R_2$ is large with respect to the internal emitter-base resistance of transistor T, so that a substantially constant current flows through resistor $R_2$. A small portion of this current flows as base current to the transistor, but by far the greater portion flows through capacitor $C_1$ to the collector C. The current of substantially constant value flowing through capacitor $C_1$ causes the voltage across the capacitor to increase linearly with time. The base of transistor T is substantially at ground potential, so that the collector voltage also increases linearly with time. If transistor T becomes saturated, substantially the entire current through resistor $R_2$ flows to the base of the transistor.

One explanation for the improvement in the ratio between the output voltage which is induced in the reading conductor by a flipped-over selected core and the interference voltage which is obtained by the use of the invention is the following: The interference voltage induced by a core as a function of time is more constant when using read-out pulses having leading linear edges and is also smaller than when the read-out pulses have exponential leading edges; therefore, the compensation of the alternately positive and negative interference voltages induced in the read-out conductor is more effective and a smaller total interference voltage occurs in the read-out conductor.

While the invention has been described with respect to a specific embodiment, various modifications thereof will be apparent to those skilled in the art, without departing from the inventive concept, the scope of which is set forth in the following claims.

What we claim is:

1. A static magnetic core memory matrix comprising a plurality of cores composed of magnetic material having a substantially rectangular hysteresis loop with alternate remanence states, said cores being arranged in groups in rows and columns and each core storing solely a single bit of binary information as indicated by the remanence state of the core, a first group of separate read wires each inductively coupled to the cores of a respective row, a second group of separate read wires each inductively coupled to the cores of a respective column, a common read-out wire inductively coupled to all of said cores, said read-out wire being inductively coupled in opposite direction to different cores, means for reading out the remanence state of a given core thereby to determine the sense of the binary bit stored therein, said means comprising a plurality of read-drive devices each connected to the read wires of said first and second groups of read wires associated with said given core and transmitting a current pulse along said read wires, and means for minimizing disturb pulses in said read-out wire normally produced by magnetic variations in cores other than said given core comprising integrating means for modifying the current pulse of each read-drive device to impart thereto a leading edge which increases substantially linearly with time.

2. A static magnetic core memory matrix as claimed in claim 1 wherein each of said read-drive devices comprises a pulse generator and said integrating means comprises a linear integrating circuit.

3. A static magnetic core memory matrix comprising a plurality of cores composed of magnetic material having a substantially rectangular hysteresis loop with alternate remanence states, said cores being arranged in groups in rows and columns and each core storing solely a single bit of binary information as indicated by the remanence state of the core, a first group of separate read wires each inductively coupled to the cores of a respective row, a second group of separate read wires each inductively coupled to the cores of a respective column, a common read-out wire inductively coupled to all of said cores, said read-out wire being inductively coupled in opposite direction to different cores, means for reading out the remanence state of a given core thereby to determine the sense of the binary bit stored therein, said means comprising a pulse generator read-drive device connected to a read wire of said groups of cores including said given core and transmitting a current pulse along said wire, and means for minimizing disturb pulses in said read-out wire normally produced by magnetic variations in other than said given core in said group comprising a Miller integrator for modifying said current pulse to impart thereto a leading edge which increases substantially linearly with time.

References Cited

UNITED STATES PATENTS

| | | | |
|---|---|---|---|
| 2,925,469 | 2/1960 | Metzger | 307—8 |
| 3,077,584 | 2/1963 | Eschenfelder | 340—17 |
| 3,108,194 | 10/1963 | Weller | 307—8 |
| 3,241,128 | 3/1966 | Putzrath | 340—17 |
| 3,241,129 | 3/1966 | Smith | 307—8 |

BERNARD KONICK, *Primary Examiner.*

M. S. GITTES, *Assistant Examiner.*